(12) United States Patent
Yuan et al.

(10) Patent No.: US 10,565,080 B2
(45) Date of Patent: Feb. 18, 2020

(54) DISCRIMINATIVE HIDDEN KALMAN FILTERS FOR CLASSIFICATION OF STREAMING SENSOR DATA IN CONDITION MONITORING

(71) Applicant: Siemens Aktiengesellschaft, Munich (DE)

(72) Inventors: Chao Yuan, Plainsboro, NJ (US); Amit Chakraborty, East Windsor, NJ (US); Holger Hackstein, Dietzenbach (DE); Leif Wiebking, Karlsruhe (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 544 days.

(21) Appl. No.: 14/406,606

(22) PCT Filed: Jun. 11, 2013

(86) PCT No.: PCT/US2013/045059
§ 371 (c)(1),
(2) Date: Dec. 9, 2014

(87) PCT Pub. No.: WO2013/188326
PCT Pub. Date: Dec. 19, 2013

(65) Prior Publication Data
US 2015/0142384 A1    May 21, 2015

Related U.S. Application Data

(60) Provisional application No. 61/658,518, filed on Jun. 12, 2012.

(51) Int. Cl.
*G06F 11/30* (2006.01)
*G06F 17/18* (2006.01)

(52) U.S. Cl.
CPC ......... *G06F 11/3089* (2013.01); *G06F 17/18* (2013.01)

(58) Field of Classification Search
CPC ...................... G06F 11/3089; G06F 11/008
(Continued)

(56) References Cited

U.S. PATENT DOCUMENTS 4,937,763 A    6/1990  Mott
5,956,702 A *  9/1999  Matsuoka .............. G06N 3/049
                                                    704/250

(Continued)

FOREIGN PATENT DOCUMENTS

CN       201000563 Y       1/2008

OTHER PUBLICATIONS

Kevin P. Murphy, Switching Kalman Filters, Aug. 21, 1998, Compaq Cambridge Research Lab Tech. Report 89-10, pp. 1-16.*
(Continued)

*Primary Examiner* — Eman A Alkafawi (57) ABSTRACT

A method for monitoring a condition of a system or process includes acquiring sensor data from a plurality of sensors disposed within the system (S41 and S44). The acquired sensor data is streamed in real-time to a computer system (S42 and S44). A discriminative framework is applied to the streaming sensor data using the computer system (S43 and S45). The discriminative framework provides a probability value representing a probability that the sensor data is indicative of an anomaly within the system. The discriminative framework is an integration of a Kalman filter with a logistical function (S41).

9 Claims, 5 Drawing Sheets

(58) Field of Classification Search
USPC .......................................................... 702/181
See application file for complete search history.

(56) References Cited

U.S. PATENT DOCUMENTS

| | | | |
|---|---|---|---|
| 7,243,265 B1 | 7/2007 | Wookey et al. | |
| 2004/0153216 A1 | 8/2004 | Tan | |
| 2008/0300879 A1* | 12/2008 | Bouchard | G06F 11/008 |
| | | | 704/256 |
| 2011/0196820 A1* | 8/2011 | Yuan | G05B 23/0221 |
| | | | 706/52 |
| 2011/0206236 A1 | 8/2011 | Center, Jr. | |
| 2012/0004867 A1* | 1/2012 | Mousavi | G01R 31/3274 |
| | | | 702/58 |

OTHER PUBLICATIONS

Alan S. Willksy, A Survey of Design Methods for Failure Detection in Dynamic Systems, Automatica, vol. 12, pp. 601-611. Pergamon Press, 1976. (Year: 1976).*

Ekelin, S., et al: "Continuous Monitoring of Available Bandwidth over a Network Path," Swedish National Computer Networking Workshop, XP-002399913; 2004; Nov. 23, 2004.

Schumann, J., et al.; "Tools and Methods for the Verification and Validation of Adaptive Aircraft Control Systems," Aerospace Conference, 2007, IEEE; XP031214318; pp. 1-8; 2007; US; Mar. 3, 2007.

* cited by examiner

DISCRIMINATIVE HIDDEN KALMAN FILTERS FOR CLASSIFICATION OF STREAMING SENSOR DATA IN CONDITION MONITORING

CROSS-REFERENCE TO RELATED APPLICATION

The present application is based on provisional application Ser. No. 61/658,518, filed Jun. 12, 2012, the entire contents of which are herein incorporated by reference.

TECHNICAL FIELD

The present disclosure relates to condition monitoring and, more specifically, to discriminative hidden Kalman filters for classification of streaming sensor data in condition monitoring.

DISCUSSION OF THE RELATED ART

Condition monitoring is an approach for detecting failures and future problems in complex machinery and/or automated processes. Rather than simply replacing parts at a predetermined duty cycle or waiting for a failure to occur, condition monitoring uses data from a network of sensors to report on the condition of the system or process being monitored. For example, sensors may be used to report on such conditions as temperature, pressure, and velocity at various key locations. The objective of conventional condition monitoring is to detect sensor data that is outside of acceptable ranges so that the cause of this anomaly may be investigated and remediated.

Ideally, condition monitoring may be used to catch potential problems at an early stage such that maintenance can be carried out in a timely manner without waiting for a failure, which may prove to be extremely costly

SUMMARY

A method for monitoring a condition of a system or process includes acquiring sensor data from a plurality of sensors disposed within the system. The acquired sensor data is streamed in real-time to a computer system. A discriminative framework is applied to the streaming sensor data using the computer system. The discriminative framework provides a probability value representing a probability that the sensor data is indicative of an anomaly within the system. The discriminative framework is an integration of a Kalman filter with a logistical function.

The anomaly may be a malfunction or failure within the system. The anomaly may be indicative of a potential malfunction or failure within the system.

The method may additionally include reporting on a status of the system based on the probability value provided by the discriminative framework.

The method may additionally include automatically initiating remedial action on system based on the probability value provided by the discriminative framework. The remedial action may include generating an alert, partially or fully suspending operation of the system, generating a service order for system maintenance, or generating a purchase order for replacement parts for the system.

Monitoring of the condition of the system or process may be continuous.

Prior to applying the discriminative framework on the streaming sensor data, the discriminative framework may be trained using the streaming sensor data. Integration of the Kalman filter with the logistical function may be performed prior to the training of the discriminative framework.

The discriminative framework may calculate the probability value using the equation:

$$P(y_t | u_t, w) = \frac{1}{1 + \exp(-y_t w^T u_t)}$$

where $y_t$ is a class label at a given time t, where y is equal to one of two discrete values, $u_t$ represents hidden state variables at the given time t, where the hidden state variable values are real numbers having a Gaussian distribution, w is a parameter of the logistic function, and $w^T$ is the transpose of w.

A method for monitoring a condition of a system or process includes acquiring sensor data from a plurality of sensors disposed within a system. The acquired sensor data is streamed in real-time to a computer system. A discriminative framework is applied to the streaming sensor data using the computer system. The discriminative framework calculates a probability that the sensor data is indicative of an anomaly within the system using the equation:

$$P(y_t | u_t, w) = \frac{1}{1 + \exp(-y_t w^T u_t)}$$

where $y_t$ is a class label at a given time t, where y is equal to one of two discrete values, $u_t$ represents hidden state variables at the given time t, w is a parameter of a logistic function, and $w^T$ is the transpose of w.

The hidden state variable values may be real numbers having a Gaussian distribution.

The anomaly may be a malfunction or failure within the system.

The anomaly may be indicative of a potential malfunction or failure within the system.

The method may additionally include reporting on a status of the system based on the probability provided by the discriminative framework.

The method may additionally include automatically initiating remedial action on the system based on the probability provided by the discriminative framework.

A computer system includes a processor and a non-transitory, tangible, program storage medium, readable by the computer system, embodying a program of instructions executable by the processor to perform method steps for monitoring a condition of a system or process. The method includes acquiring sensor data from a plurality of sensors disposed within the system. The acquired sensor data is streamed in real-time to a computer system. A discriminative framework is applied on the streaming sensor data using the computer system. The discriminative framework provides a probability value representing a probability that the sensor data is indicative of an anomaly within the system. The discriminative framework is an integration of a Kalman filter with a logistical function.

The anomaly may be a malfunction or failure within the system or an indication of a potential malfunction or failure within the system.

The discriminative framework may calculates the probability value using the equation:

$$P(y_t \mid u_t, w) = \frac{1}{1 + \exp(-y_t w^T u_t)}$$

where $y_t$ is a class label at a given time t, where y is equal to one of two discrete values, $u_t$ represents hidden state variables at the given time t, where the hidden state variable values are real numbers having a Gaussian distribution, w is a parameter of the logistic function, and $w^T$ is the transpose of w.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide methods and systems for performing condition monitoring within a system or an automated process. Where a system is being monitored, a plurality of sensors may be installed at various locations within the machinery. These sensors may report on any observable attribute such as, but no limited to, temperature, pressure, expansion and contraction, speed, angular velocity, acceleration, revolutions per minute, frequency, stress, sound, color, humidity, viscosity, voltage, current, impedance, alignment, position, flux, diffusion, etc.

As described above, conventional approaches to condition monitoring may monitor sensor data to determine when one or more sensor readings are out of an acceptable range. The acceptable range may be manually set by an operator based on manufacturer tolerances, intuition, and past experiences. Automated approaches may use computer learning techniques and trained classifiers to determine when sensor data is indicative of trouble.

Figure 3:
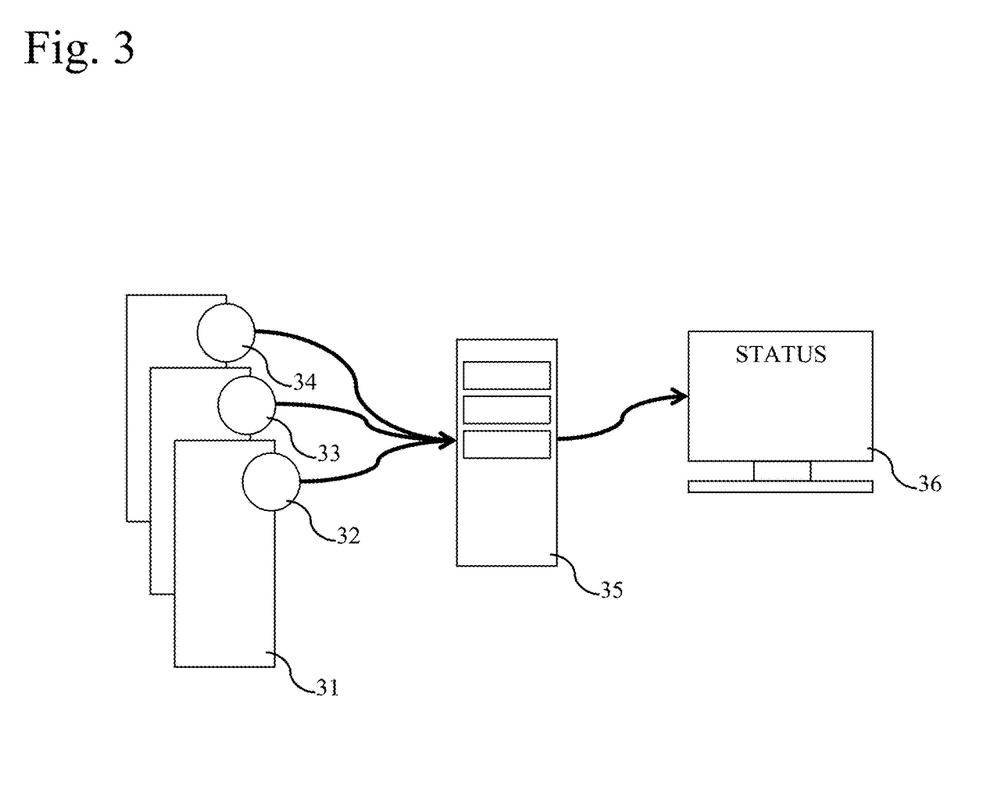
FIG. 3 is a schematic diagram illustrating a system for detecting signs of failure within a system or automated process being monitored in accordance with exemplary embodiments of the present invention.

Exemplary embodiments of the present invention receive sensor data as a real-time data stream and analyze the sensor data using a novel discriminative framework to detect signs of trouble within the system or automated process being monitored. FIG. 3 is a schematic diagram illustrating a system for detecting signs of failure within a system or automated process being monitored in accordance with exemplary embodiments of the present invention. Here machinery under monitoring 31 may includes one or more mechanical systems. Sensors 32, 33, and 34 may be installed within the machinery under monitoring 31. Where the machinery under monitoring 31 includes multiple mechanical systems, there may be one or more sensors installed in each mechanical system. The sensors 32, 33, and 34 may stream sensor data to a computer system 35. The computer system 35 may receive this streaming sensor data, apply the novel discriminative framework described herein to the received sensor data, and produce an output. The output may include an indication of a status of the machinery under monitoring 31 and this status may be displayed on a display device 36 and/or other steps may be taken to perform remedial action when the status is indicative of a potential failure.

For example, when signs of trouble are detected, an alert may be generated so that remedial action may be performed. The novel discriminative framework utilizes elements of Kalman filtering and merges these elements with a logistical function into a single discriminative framework that may be trained on and applied to the monitoring of the streaming sensor data so that accurate determinations of potential problems may be made while minimizing computational overhead.

The novel discriminative framework is described in more detail below. For the purposes of this description, the following notation is used: The plurality of sensors included d sensors and thus the output of the plurality of sensors is expressed as a sensor vector over time $x_t$, where $x_t$ is a d-dimensional vector. It may be assumed that sensor streaming begins at a time t=1. The goal of the discriminative framework is to take as input the sensor vector $x_t$ and to provide a binary output of a failure or a non-failure. This binary output may be expressed as a class label $y_t$ where y may equal one of two discrete values, for example, +1 indicating failure and −1 indicating normal operation. The output may also be represented as a probability for failure $P(y_t|x_{1:t})$, which may represent, for a present time t, the probability that $y_t$=+1 given the sensor vector $x_t$ from time=1 up till time=t (for example, for times t=1, t=2, . . . , t=t).

Because the novel discriminative framework incorporates a logistic function, the output of the framework may be a simple probability of failure rather than a complex value that would need further mathematical analysis and interpretation. This simple output may be well adapted for real-time monitoring of high-dimensional sensor data using limited computational resources.

For example, some approaches for interpreting sensor data utilize generative models for classification such as Hidden Markov Models (HMM) or feature extraction. However, generative models spend most of their efforts on describing the sensor signals $x_t$ or estimating the probability that the sensor signal is a particular value given the sensor vector over time $P(x_{1:t})$. These approaches do not provide classification of $P(y_t|x_{1:t})$, as is done in the novel discriminative framework. Thus these other approaches may suffer if there are many irrelevant signals or noises in $x_{1:t}$. In contrast, the novel discriminative framework focuses on modeling $P(y_t|x_{1:t})$.

Discriminative techniques such as conditional random field (CRF) have been developed. The CRF directly learns the conditional model $P(y_t|x_{1:t})$, which is the probability of a particular state since time t=1 given the input vector since time=1. Hidden conditional random fields (HCRF), a variation of CRF, introduces a discrete hidden layer between the sensor data and the class label $y_t$ to account for more complicated status. However, both CRF and HCRF do not integrate the input trending information in their formulation, which, if applied to condition monitoring, would be trends of the sensor data, and thus may be poorly suited for machine condition monitoring applications.

As described above, exemplary embodiments of the present invention utilize a novel discriminative framework that incorporates aspects of Kalman filtering. However, applying standard Kalman filtering to the problem of condition monitoring would focus on feature extraction (state estimation) instead of classification. Nonetheless, exemplary embodiments of the present invention do still incorporate aspects of Kalman filtering into the novel discriminative framework.

Figure 1:
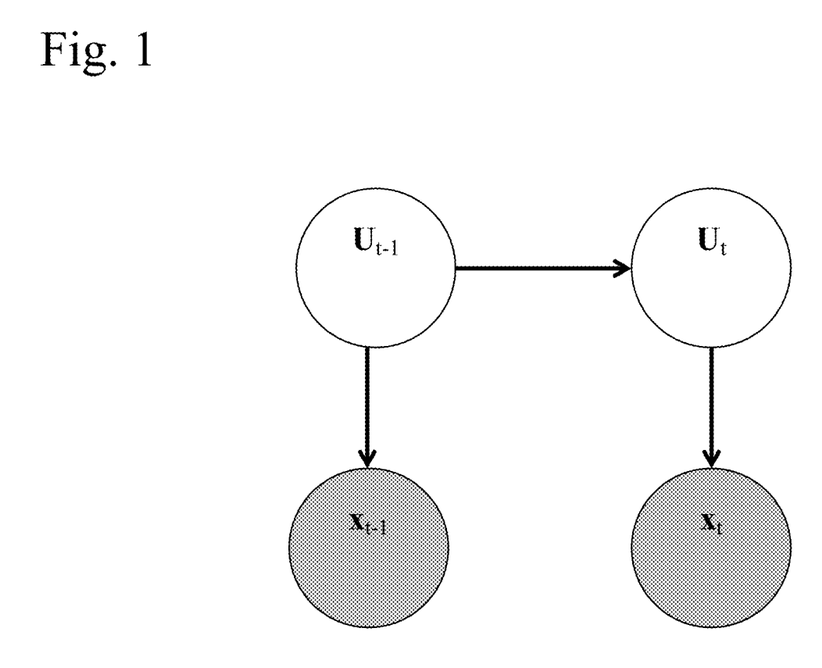
FIG. 1 is a diagram illustrating a representation of Kalman filtering. Here the shaded nodes represent the observed variables.

FIG. 1 is a diagram illustrating a representation of Kalman filtering. Here the shaded nodes represent the observed variables. Here $x_t$ represents a present observed variable while $x_{t-1}$ represents a prior-observed variable. From these observed variables, hidden state variables $u_t$ and $u_{t-1}$ may be determined. The hidden state variable are shown as the open nodes. However, in standard Kalman filtering, the hidden state variables represent real numbers having fractional or decimal components. Thus if applied to the problem of condition monitoring, the output of the Kalman filter would be a real number value and not a binary indication of failure, or more precisely, a probability of a real number value and not a probability of failure.

Exemplary embodiments of the present invention therefor fuse aspects of Kalman filtering with a logistic function within a common discriminative framework and then apply this discriminative framework to the problem of condition monitoring to directly produce the desired $P(y_t|x_{1:t})$ output.

Figure 2:
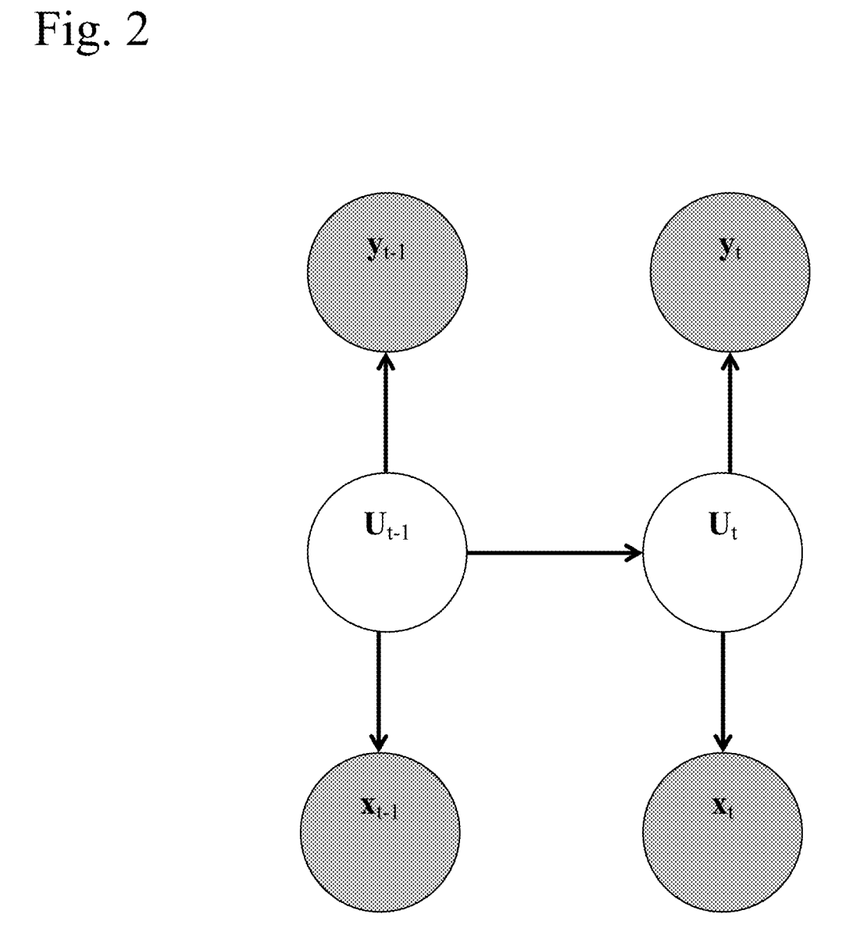
FIG. 2 is a diagram illustrating a representation of aspects of the novel discriminative framework in accordance with exemplary embodiments of the present invention.

FIG. 2 is a diagram illustrating a representation of aspects of the novel discriminative framework in accordance with exemplary embodiments of the present invention. Here, in addition to the observed variables $x_t$ and $x_{t-1}$ and the determined hidden state variables $u_t$ and $u_{t-1}$, $y_t$ is the class label and is observed during training and unobserved during monitoring. However, here the class labels, rather than representing an arbitrary real number, actually represent logistical function values, here −1 and +1. As it is this discriminative framework that is trained and monitored, the desired $P(y_t|x_{1:t})$ output is directly produced and thus limited computational resources are focused expressly on determining this result.

Classifying streaming sensor data may involve, first, how to extract features representing trending from sensor data, and second, how to integrate feature extraction into a discriminative framework. Exemplary embodiments of the present invention concretize a generalized pattern recognition framework. In particular, useful trending features such as signal value and gradient are conceptualized as hidden states in a Kalman filter and Kalman filtering is applied to extract these features. A class label layer is integrated into the Kalman filter and mapping is learned from sensor signals to the class label with the features as hidden variables. By doing this, exemplary embodiments of the present invention provide a complete model integrating both the feature extraction and classification in the same discriminative framework.

We will first introduce the standard Kalman filter model. Then we embed this model into our discriminative framework, followed by training, testing and nonlinear extension of the proposed model.

As described above, FIG. 1 provides a graphical representation of a Kalman filter, which can also be described by the following probabilities:

$$P(x_t|u_t)=N(x_t|Cu_t,R),$$

$$P(u_t|u_{t-1})=N(u_t|Au_{t-1},Q), \quad (1)$$

The first equation in (1) is the observation model: given state $u_t$, the observation $x_t$ has a Gaussian distribution with mean of $Cu_t$ and covariance of R. Here C is the observation matrix. The second equation in (1) denotes the state transition model: given the previous state $u_{t-1}$, the current state $u_t$ has a Gaussian distribution with mean of $Ax_{t-1}$ and covariance of Q. The parameters θ include C, R, A and Q.

Once the parameters are set or learned, during monitoring, the state $u_t$ may be recursively estimated using a Kalman filtering algorithm. For example, where an estimate of state $u_{t-1}$ at time t−1, which has a Gaussian distribution given all available observations:

$$P(u_{t-1}|x_{1:t-1})=N(u_{t-1}|m_{t-1},V_{t-1}). \quad (2)$$

Then the state $u_t$ may also have a Gaussian distribution:

$$P(u_t|x_{1:t})=N(u_t|m_t,V_t). \quad (3)$$

where $$m_t=(I-K_tC)Am_{t-1}+K_tx_t,$$

$$V_t=(I-K_tC)\tilde{V}_t,$$

$$\tilde{V}_t=AV_{t-1}A^T+Q,$$

$$K_t=\tilde{V}_tC^T(C\tilde{V}_tC^T+R)^{-1} \quad (4)$$

However, each state $u_t$ may be viewed as having the following Gaussian distribution:

$$P(u_t|x_{1:t},\theta)=N(u_t|m_t(\theta,x_{1:t}),V_t(\theta)). \quad (5)$$

where both its mean and covariance are functions depending on Kalman filter parameters θ and constants that include time t and observed sensor signals $x_{1:t}$.

As discussed above, FIG. 2 is a symbolic illustration of the novel discriminative framework. This framework may be described by the following dependencies. First, hidden state $u_t$ depends on $x_{1:t}$ as indicated by the Kalman filtering equation (5). Second, the conditional probability of class label $y_t$, given the state $u_t$, is a logistic function:

$$P(y_t|u_t,w) = \frac{1}{1+\exp(-y_tw^Tu_t)}. \quad (6)$$

Here, w is the parameter of this logistic function and $w^T$ is the transpose of w.

A conditional random field directly models the conditional probability of class label $y_t$ given observed signals $x_t$ without any hidden variables. Although CRF has the ability to extract features from multiple observed signals such as $x_{1:t}$, such features are pre-determined. In contrast, exemplary embodiments of the present invention may incorporate hidden variables (for example, as seen in FIG. 2) into the model such that feature extraction or inference of hidden variable $u_t$ is done automatically. The features extracted in this way may increase the discriminative power of this model.

The model of FIG. 2 may be fully described by parameters $\Omega=\{\theta, w\}$, with $\theta$ being the parameters for the Kalman filters and $w$ being the parameters for the logistic function. Once $\Omega$ is known, for every test point $x_t$, the class label may be assigned based on:

$$P(y_t|x_{1:t},\Omega)=\int_{u_t} P(y_t|u_t,w)P(u_t|x_{1:t},\theta)du_t \approx P(y_t|m_t,w). \quad (7)$$

Where the training set consists of N training sequences $\{\{(x_t^{(n)}, y_t^{(n)})\}_{t=1}^{T_n}\}_{n=1}^{N}$, each training sequence n has Tn data points, each indicated by a sensor vector $x_t^{(n)}$ and its corresponding class label $y_t^{(n)}$. The goal of this training may be to maximize the log likelihood of the training data with respect to all parameters $\Omega=\{\theta, w\}$:

$$\sum_{n=1}^{N}\sum_{t=1}^{T_n} \log P(y_t^{(n)} | x_{1:t}^{(n)}, \Omega) + \log P(w). \quad (8)$$

The last term in equation (8) is a regularization term that may be used to avoid overfitting. Here it may be established that $P(w)=N(w|0, I)$, where I is an identity matrix. A variational expectation-maximization (EM) algorithm may be employed to optimize equation (8) by introducing the hidden variable $u_t^{(n)}$. The likelihood of all variables may then be expressed as:

$$\sum_{n=1}^{N}\sum_{t=1}^{T_n} \log P(y_t^{(n)}, u_t^{(n)} | x_{1:t}^{(n)}, \Omega) + \log P(w) = \\ \sum_{n=1}^{N}\sum_{t=1}^{T_n} (\log P(y_t^{(n)} | u_t^{(n)}, w) + \log P(u_t^{(n)} | x_{1:t}^{(n)}, \theta)) + \log P(w) \quad (9)$$

In the expectation step of the EM algorithm, we compute $P(u_t^{(n)}|y_t^{(n)}, x_{1:t}^{(n)}, \Omega)$, which is a Gaussian distribution. In the maximization step of the EM algorithm, the estimate for $\Omega$ may be refined. This may include a gradient ascent search for $\theta$ and a stationary point estimation for $w$. Once the algorithm converges, the learned parameters $\Omega$ may be output.

The above approach may be viewed as a form of linear classifier because the classification decision is based on a linear form of $w^T u_t$. However, where the decision boundary is highly nonlinear, a refined version of this approach may be more effective. As described below, the approach may be refined by viewing the above procedures as a feature extraction step and then applying a nonlinear classifier for the final decision.

For example, the training may include two steps. In the first step, $w$ and $\theta$ may be learned, as described in detail above. In the second step, $m_t$, the mean of hidden variable $u_t$ for every training data point, may be extracted and a nonlinear classifier may be learned based on all pairs of $m_t$ and $y_t$. In this step, the learned logistic parameter $w$ is not used and only Kalman filter parameters $\theta$ is used to extract feature $m_t$. During testing, for every test input $x_t$, the corresponding feature $m_t$ is extracted and fed to the nonlinear classifier for a decision.

The following parameter setting may be used in implementing the above-described approach. For a set of d sensor signals, the hidden variable $u_{t,i}$ for signal i (i=1:d) is defined as $u_{t,i}=[\tilde{x}_{t,i}\ d\tilde{x}_{t,i}]^T$. Where $\tilde{x}_{t,i}$ is the original signal value and $d\tilde{x}_{t,i}$ is the signal gradient for signal i. The combined hidden variable $u_t$ is thus $[u_{t,1}^T\ u_{t,2}^T\ \ldots\ U_{t,d}^T]^T$. Herein, a Kalman filter may be indexed by i for each signal independently.

The original signal may be contaminated by Gaussian noise with zero mean and a scalar variance $R_i$, and accordingly, the observation matrix may be expressed as:

$$C_i=[1\ 0]. \quad (10)$$

Here, only the signal value may be observable. Based on the principals of basic physics or Taylor series, the following may be established:

$$\tilde{x}_{t,i} = \tilde{x}_{t-1,i} + \Delta t d\tilde{x}_{t-1,i} + \frac{1}{2}\Delta t^2 d^2\tilde{x}_{t-1,i}, \quad (11)$$
$$d\tilde{x}_{t,i} = d\tilde{x}_{t-1,i} + \Delta t d^2\tilde{x}_{t-1,i},$$

where $\Delta t$ is the actual time gap between t−1 and t, and $d^2\tilde{x}_{t,i}$ indicates the second-order derivative. Because only the value and gradient are considered here, $d^2\tilde{x}_{t,i}$ may be viewed as a Gaussian noise with zero mean and variance $\sigma_i^2$. From equation (11), the hidden state transition matrix may be expressed as:

$$A_i = \begin{bmatrix} 1 & \Delta t \\ 0 & 1 \end{bmatrix}. \quad (12)$$

The transition noise covariance matrix may be expressed as:

$$Q_i = \begin{bmatrix} \Delta t^4/4 & \Delta t^3/2 \\ \Delta t^3/2 & \Delta t^2 \end{bmatrix}\sigma_i^2. \quad (13)$$

Accordingly, for the Kalman filter, $A_i$ and $C_i$ may be fixed and each of Ri and Qi may be represented by only one parameter. Such a Kalman filter may then be applied to each signal independently. It is to be understood that this approach may be applied to higher order dynamics and the dimensions of all matrices may be increase accordingly.

Figure 4:
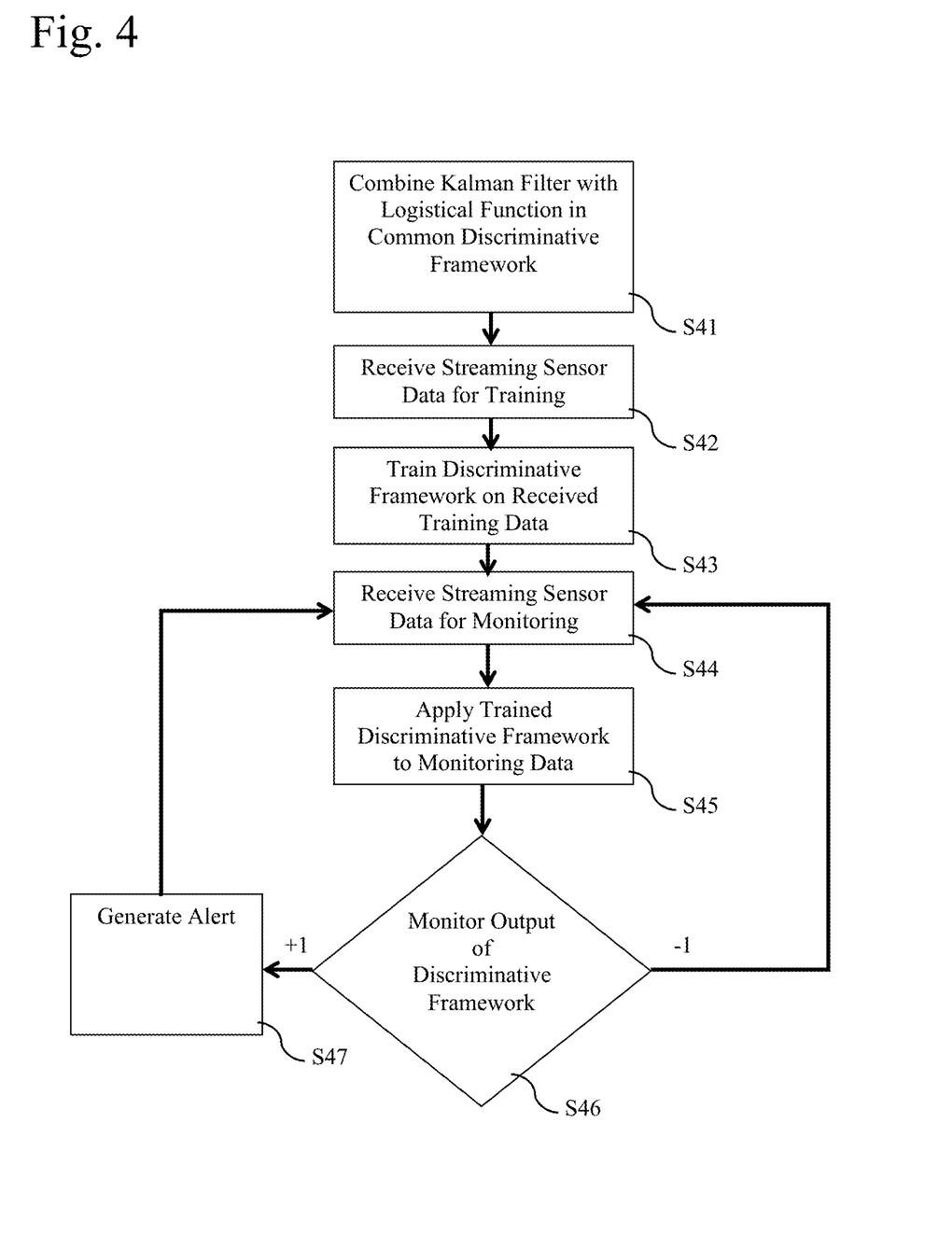
FIG. 4 is a flow chart illustrating an approach for condition monitoring within a system or an automated process in accordance with exemplary embodiments of the present invention.

The above calculative approach for building a novel discriminative framework may be applied to the problem of condition monitoring. FIG. 4 is a flow chart illustrating an approach for condition monitoring within a system or an automated process in accordance with exemplary embodiments of the present invention. First, a common discriminative framework may be established by integrating a Kalman filter with a logistical function (Step S41). The novel discriminative framework discussed in detail above is an example of such an integrated discriminative framework. This integration is more than a mere application of a Kalman filter followed by a logistical function. Here, the Kalman filter is merged with a logistical function prior to the training of the discriminative function using the sensor data, which may occur in step S43. The integrated discriminative framework may be so-created to produce an output, based on an input sensor data stream, that is expressed as a probability of the input sensor data stream indicating an anomaly within the machinery or process under test. Thus, the output is a probability of a binary result, which may be, for example, a −1 or +1.

Next, streaming sensor data may be received (Step S42). The received streaming sensor data may be received in real-time from the various sensors installed throughout the machinery under monitoring. The common discriminative framework may then be trained on the received training data (Step S43). Thus the received training data is not used to train a Kalman filter independently, but rather, it is the integrated common discriminative filter, with logistical function component, that is trained by the training data.

Then, streaming sensor data may be received (Step S44). This sensor data stream may be part of the same stream that began in step S42. The trained discriminative framework may then be applied to the sensor data stream (Step S45). The results of the application of the trained discriminative framework may then be monitored (Step S46) to determine whether an anomaly is identified (e.g. +1) or whether an anomaly is not identified (e.g. −1). For example, the output of the trained discriminative framework may be expressed as a probability that the data implicates an anomaly (+1 state). Identification of an anomaly may generate an alert (Step S47). The alert may be a message or status displayed to a user for the purposes of taking remedial action to diagnose and/or cure the anomaly and/or an automated process for doing so may be implemented. This automated process may include, for example, an automatic ordering of replacement parts, generation of a work order, a reduction or stopping of the system or process being monitored, or some other action. Regardless of the output, the method may continue to receive streaming sensor data for monitoring (Step S44) and the discriminative framework may be applied thereto.

Figure 5:
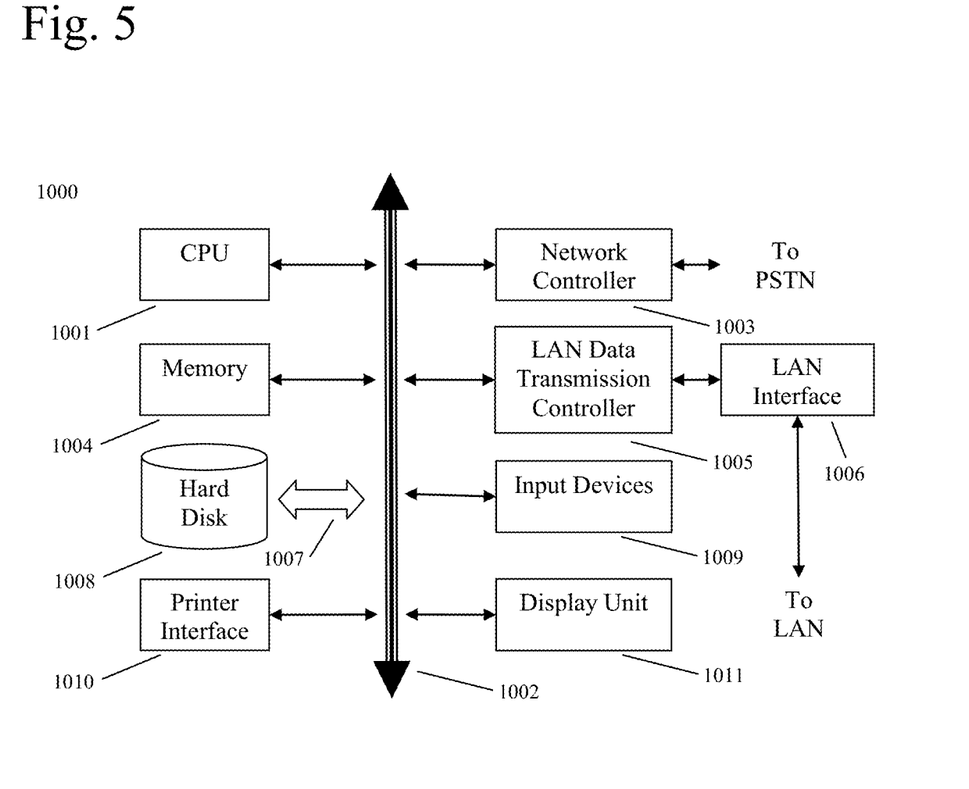
FIG. 5 shows an example of a computer system capable of implementing the method and apparatus according to embodiments of the present disclosure.

As described above, the training and application of the discriminative framework may be performed using a computer system 35. FIG. 5 shows an example of a computer system which may be used to implement the above-described discriminative framework. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for monitoring a condition of a system or process, comprising:
acquiring sensor data from a plurality of sensors disposed within the system;
streaming the acquired sensor data in real-time to a computer system;
at the computer system, collecting the acquired sensor data corresponding to a current time value and a plurality of earlier time values to yield a plurality of sensor data observations;
applying, by the computer system, a discriminative function to the sensor data, the discriminative function including a merged Kalman filter and logistic function that are trained simultaneously using prior sensor data;
determining for each of the plurality of sensor data observations, by the discriminative function, a probability of malfunction or failure within the system;
if the probability indicates a system malfunction or failure, automatically initiating a remedial action comprising one or more of generating an alert, partially or fully suspending operation of the system, generating a service order for system maintenance, or generating a purchase order for replacement parts for the system.

2. The method of claim 1, additionally including reporting on a status of the system based on the probability of a malfunction or failure within the system.

3. The method of claim 1, wherein monitoring of the condition of the system or process is continuous.

4. The method of claim 1, wherein the logistic function comprises the equation:

$$P(y_t \mid u_t, w) = \frac{1}{1 + \exp(-y_t w^T u_t)}$$

where $y_t$ is a class label at a given time t, where y is equal to one of two discrete values indicating failure or normal operation of the system, $u_t$ represents the plurality of hidden sensor state variables at the given time t, where the plurality of hidden sensor state variable values are real numbers having a Gaussian distribution, w is a parameter of the logistic function learned by maximizing a log likelihood function with respect to w using a set of training data, and $w^T$ is the transpose of w.

5. A method for monitoring a condition of a system or process, comprising:
receiving a stream of sensor data acquired from a plurality of sensors disposed within a system;
at the computer system, collecting sensor data corresponding to a current time value and a plurality of earlier time values from the stream of sensor data to yield a plurality of sensor data observations;
applying, by the computer system, a discriminative function to determine a plurality of hidden sensor state variables based on the plurality of sensor data observations, the discriminative function including a merged Kalman filter and logistic function that are trained simultaneously using prior sensor data;
determining a probability of a malfunction or failure within the system for each of the plurality of sensor data observations using the logistic function parameterized by the plurality of hidden sensor state variables, wherein the logistic function comprising the equation:

$$P(y_t \mid u_t, w) = \frac{1}{1 + \exp(-y_t w^T u_t)}$$

where $y_t$ is a class label at a given time t, where y is equal to one of two discrete values indicating failure or normal operation of the system, $u_t$ represents the plurality of hidden sensor state variables at the given time t, w is a parameter of a logistic function learned by maximizing a log likelihood function with respect to w using a set of training data, and $w^T$ is the transpose of w;

if the probability indicates a system malfunction or failure, automatically initiating a remedial action comprising one or more of generating an alert, partially or fully suspending operation of the system, generating a service order for system maintenance, or generating a purchase order for replacement parts for the system.

6. The method of claim 5, wherein the plurality of hidden sensor state variable values are real numbers having a Gaussian distribution.

7. The method of claim 5, additionally including reporting on a status of the system based on the probability of the malfunction or failure within the system.

8. A computer system comprising:
a processor; and
a non-transitory, tangible, program storage medium, readable by the computer system, embodying a program of instructions executable by the processor to perform method steps for monitoring a condition of a system or process, the method comprising:
receiving a stream of sensor data acquired from a plurality of sensors disposed within the system;
collecting sensor data corresponding to a current time value and a plurality of earlier time values from the stream of sensor data to yield a plurality of sensor data observations;
applying a discriminative function to the plurality of sensor data observations, the discriminative function including a merged Kalman filter and logistic function that are trained simultaneously using prior sensor data;
determining a probability of a malfunction or failure within the system for each of the plurality of sensor data observations using the discriminative function, the logistic function parameterized by the plurality of hidden sensor state variables;
if the probability indicates a system malfunction or failure, automatically initiating a remedial action comprising one or more of generating an alert, partially or fully suspending operation of the system, generating a service order for system maintenance, or generating a purchase order for replacement parts for the system.

9. The computer system of claim 8, wherein the logistic function comprises the equation $$P(y_t \mid u_t, w) = \frac{1}{1 + \exp(-y_t w^T u_t)}$$

where $y_t$ is a class label at a given time t, where y is equal to one of two discrete values indicating failure or normal operation of the system, $u_t$ represents the plurality of hidden sensor state variables at the given time t, where the plurality of hidden sensor state variables values are real numbers having a Gaussian distribution, w is a parameter of the logistic function learned by maximizing a log likelihood function with respect to w using a set of training data, and $w^T$ is the transpose of w.

* * * * *